Patented Feb. 4, 1930

1,745,819

UNITED STATES PATENT OFFICE

BURR W. TUTTLE, OF CHICAGO, ILLINOIS

CEMENT

No Drawing. Application filed September 27, 1926. Serial No. 138,129.

This invention relates to cement for use in connection with porcelain, enamel ware, vitreous ware, ceramic ware or metals.

This application is in part a continuation of my former application for cement, Serial No. 682,582, filed December 24, 1923, Patent Number 1,719,914.

The objects of this invention are to provide an improved cement which may be readily colored for matching the material on which it is to be used, as for instance in repairing articles or fastening parts together; to provide a cement which is basically substantially white in color but which may be tinted or colored for different uses; to provide a cementitious compound which will harden or set in a relatively short time and which will be sufficiently strong and will resist pressure, as for instance, when used for repairing pipes; and to provide such an improved cement or composition as will be described more fully hereinafter.

My improved cement consists in general of asbestos, oxide of zinc and shellac, either with or without a coloring pigment.

In order to produce the best results, I use asbestos in the form commonly known as "asbestine" or ground asbestos. I also use French oxide of zinc which is whiter than the ordinary commercial form of oxide of zinc and also use white shellac as distinguished from the ordinary commercial shellac or colored shellac.

In preparing my cement, I take ten parts, by measure, of asbestine (or ground asbestos) and nine parts of French oxide of zinc and thoroughly mix the same. I than take shellac, (comprising lac dissolved in alcohol) and mix the same with a white pigment such as lithopone to make it as near pure white as possible in order to form a base which may be colored by adding different pigments. A sufficient amount of such white or colored shellac is then added to the mixture of asbestine and oxide of zinc to make a comparatively thick paste so that all of the mixture is thoroughly incorporated in the shellac. The shellac may be colored before mixing by adding thereto any suitable pigment and the resulting cement may thus be given any desired color. When the white cement is to be made, I may also add approximately two ounces of castor oil to each gallon of shellac which will prevent checking when the cement dries. One particular composition or formula for my improved cement is as follows: To four gallons of white or bleached shellac I add twenty pounds of asbestine, eleven ounces of oxide of zinc, and in some instances fourteen pounds of lithopone which constitutes the white pigment, and to this is added about eight ounces of castor oil.

When the cement is applied, the alcohol which is usually denatured in which the lac is dissolved will evaporate, leaving a hard compact mass which adheres closely to practically all kinds of materials or surfaces. Furthermore, the cement has a sufficiently high tensile strength so that it is adapted for use in filling cracks in pipes, such as water pipes which are required to withstand pressure and may also be used for various other purposes which will readily suggest themselves.

The exact proportions of the ingredients are not critical, and changes may be made therein without departing from the scope of this invention, and therefore I do not wish to be limited to the exact composition herein described, except as pointed out in the following claims, in which I claim:

1. A cement comprising ten parts, by weight, of asbestos and nine parts of zinc oxide to which is added a sufficient amount of shellac to make a substantially thick paste.

2. The herein described composition comprising ten parts, by weight, of ground asbestos, nine parts of oxide of zinc, and a binder comprising shellac having lithopone mixed therewith, and having a small percentage of castor oil added thereto to prevent checking.

3. A cement comprising substantially ten parts, by weight, of finely comminuted asbestos, nine parts of oxide of zinc, and a sufficient quantity of shellac to make a thick paste.

4. A cementitious compound comprising the following ingredients in the proportions specified: four gallons of white shellac, twenty pounds of asbestos, fourteen pounds of lithopone, and eleven ounces of oxide of zinc.

BURR W. TUTTLE.